United States Patent
Lee et al.

(10) Patent No.: US 7,145,861 B2
(45) Date of Patent: Dec. 5, 2006

(54) APPARATUS FOR RECORDING AND/OR REPRODUCING OPTICAL DISK

(75) Inventors: Kyung-geun Lee, Gyeonggi-do (KR); In-sik Park, Gyeonggi-do (KR); Jung-wan Ko, Gyeonggi-do (KR); Makoto Usui, Osaka (JP); Motoshi Ito, Osaka (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 10/886,554

(22) Filed: Jul. 9, 2004

(65) Prior Publication Data

US 2004/0240367 A1    Dec. 2, 2004

Related U.S. Application Data

(63) Continuation of application No. 10/138,533, filed on May 6, 2002, now Pat. No. 6,999,390.

(51) Int. Cl.
*G11B 7/00* (2006.01)

(52) U.S. Cl. ............... 369/275.3; 369/47.28; 369/53.15

(58) Field of Classification Search ............. 369/47.28, 369/275.3, 44.26, 44.13, 53.15, 53.24
See application file for complete search history.

(56) References Cited

U.S. PATENT DOCUMENTS 6,898,172 B1 *    5/2005    Fairman et al. .......... 369/275.3

FOREIGN PATENT DOCUMENTS

| EP | 1 258 884 | 11/2002 |
|---|---|---|
| JP | 10-289528 | 10/1998 |
| JP | 2000-215452 | 8/2000 |
| KR | 2000-75374 | 12/2000 |

* cited by examiner

*Primary Examiner*—Nabil Hindi
(74) *Attorney, Agent, or Firm*—Stein, McEwen & Bui, LLP

(57) ABSTRACT

An optical disk and a method of recording data in the optical disk are provided. When data is overwritten on a recordable and/or reproducible optical disk, the method includes performing linking in front of a physical cluster from which overwriting starts. According to the method, when overwriting is performed on a portion of an optical disk in which data has been recorded, or when overwriting is performed on a portion including a defective area, linking is performed in front of the portion on which the overwriting is performed or behind the defective area, thereby realizing reliable data recording and reproducing.

26 Claims, 4 Drawing Sheets

APPARATUS FOR RECORDING AND/OR REPRODUCING OPTICAL DISK

CROSS-REFERENCE TO RELATED APPLICATION

This is a continuation application of U.S. patent application Ser. No. 10/138,533, filed May 6, 2002 now U.S. Pat. No. 6,999,390 and currently pending, the disclosure of which is incorporated herein by reference.

BACKGROUND OF THE INVENTION

1. Field of the Invention

The present invention relates to a high-density optical disk and a method of recording data in the high-density optical disk, and more particularly, to an optical disk in which data is continuously recorded and then linking is defined at a portion where an overwriting area starts, and a method of recording data in the optical disk.

2. Description of the Related Art

Generally, optical disks are widely employed as information recording media by optical pickup apparatuses for recording or reproducing information in a noncontact way and are classified into compact disks (CDs) and digital versatile disks (DVDs) according to information-recording capacity. Representative recordable, erasable, and reproducible optical disks are 650 MB compact disc recordables (CD-Rs), CD-rewritables (RWs), and 4.7 GB DVD-RWs. Furthermore, 23 GB high definition (HD)-DVDs are under development In the case of CD-RWs, a basic recording unit in which a predetermined capacity of data can be recorded is referred to as a packet, and the structure of the packet is shown in FIG. 1. In the packet, a plurality of run-in blocks 103 are defined in front of a user data block 105 in which user data is recorded, and a plurality of run-out blocks 110 are defined behind the user data block 105. In addition, a link block 100 is defined in front of the basic recording unit to allow continuous recording. When the user data block 105 partially includes a defective area in which data cannot be recorded, recording must be terminated in front of this defective area. However, an optical recording/reproducing method or disk structure with respect to such defective area is not defined. Accordingly, processing on defective areas can be different depending upon manufacturers of disks or recording and reproducing apparatuses, thereby causes disks to be incompatible with recording and reproducing apparatuses. This problem may commonly occur in CD family recording media, DVD family recording media, and HD-DVD family recording media. Therefore, standardization of optical disks is required.

This applicant have disclosed a method of processing a defective area by applying a linking scheme having predetermined rules to a position right behind the defective area on a DVD-RW and a recording medium in Korean Patent Publication No. 2000-75374.

However, for HD-DVDs having a capacity of 23 GB or greater which will be produced in the future, a method of processing a defective area and a disk structure related thereto have not never been defined. Moreover, a recording method at positions where overwriting starts and ends when overwriting occurs in a partial area in a data recording area has not been defined. Accordingly, as described above, compatibility problems occur, resulting in unreliable recording and reproducing. Therefore, new definitions of and standards for a recording and reproducing method and a disk structure for a case where overwriting is performed or defective areas are formed during overwriting in HD-DVDs are desired.

SUMMARY OF THE INVENTION

To solve the above-described problems, it is a first object of the present invention to provide an optical disk in which linking occurs at a position where overwriting starts and in which recording end data for terminating the recording is recorded at a position where overwriting ends, and a method of recording data in the optical disk, thereby securing compatibility between disks and disk drives and improving recording and reproducing performance on high-density optical disks.

It is a second object of the present invention to provide an optical disk in which when a defective area is produced during overwriting, recoding end data for terminating the recording is recorded in front of the defective area and linking occurs behind the defective area, and a method of recording data in the optical disk, thereby realizing smooth, continuous recording and reproducing.

To achieve the first object of the present invention, there is provided a method of recording data on a recordable and/or reproducible optical disk when data is overwritten. The method includes the step of performing linking in front of a physical cluster from which overwriting starts.

The method further includes the step of recording a guard3 for terminating the recording in a portion following a physical cluster in which overwriting ends.

The linking is performed between adjacent run-out and run-in in front of the physical cluster from which overwriting starts, and a run-in and a run-out are formed respectively in front of and behind every physical clusters to allow the data to be accurately recorded.

The run-in and the run-out comprise a guard1 and a guard2, respectively, for protecting user data.

The guard3 for terminating the recording is recorded in a run-in next to a run-out following the physical cluster in which overwriting ends, and a run-in and a run-out are formed respectively in front of and behind every physical clusters to allow the data to be accurately recorded.

To achieve the second object of the present invention, there is provided a method of recording data on a recordable and/or reproducible optical disk when the data is overwritten. The method includes the steps of performing linking in front of a physical cluster from which overwriting starts when the overwriting is performed after data has been recorded in the optical disk in units of physical clusters; and when a defective area on which recording cannot be performed is included in an area on which overwriting is performed, recording a guard3 for terminating the recording in a portion in front of the defective area.

The method further includes the step of performing linking behind the defective area.

To achieve the first object of the present invention, there is also provided an optical disk which data can be recorded in and reproduced from. The optical disk includes a plurality of physical clusters in which data is recorded; and a plurality of run-ins and run-outs provided in front of and behind the physical clusters to allow data to be accurately recorded. When overwriting is performed in units of physical clusters, linking is performed between a run-in and an adjacent run-out in front of a physical cluster from which the overwriting starts.

To achieve the second object of the present invention, there is also provided an optical disk which data can be recorded in and reproduced from. The optical disk includes a plurality of physical clusters in which data is recorded; a plurality of run-ins and run-outs provided in front of and behind the physical clusters to allow data to be accurately recorded; and a defective area in which a defect occurs before data is recorded or while data is being recorded. When overwriting is performed on a partial area including the defective area and at least one physical cluster, linking is performed between a run-in and an adjacent run-out in front of the partial area on which the overwriting is performed.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
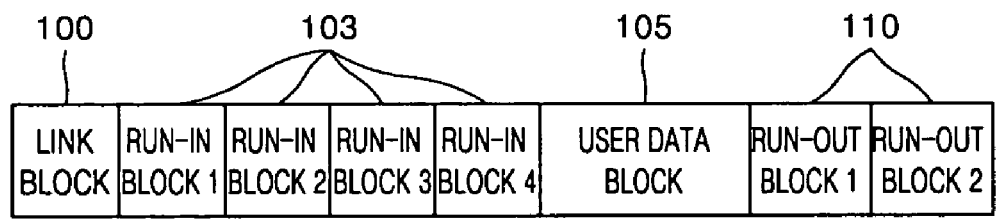
FIG. 1 is a diagram of a structure of a basic recording unit applied to a conventional compact disc rewritable (CD-RW)

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2A:
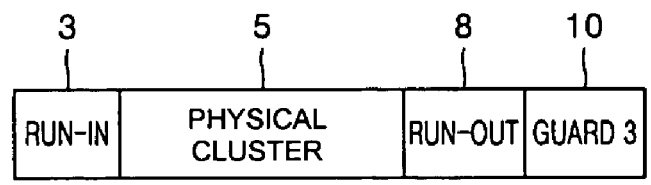
FIG. 2A is a diagram of a recording structure in which data is recorded in a single physical cluster.
Figure 2B:
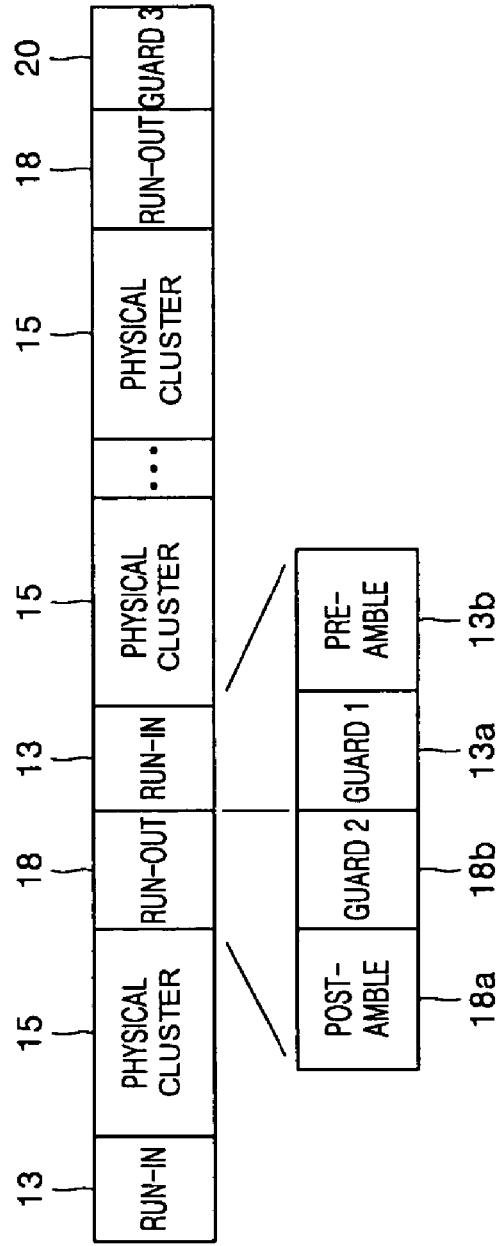
FIG. 2B is a diagram of a recording structure in which data is continuously recorded in a plurality of physical clusters.

FIG. 2A shows a case where data is recorded at a single physical cluster 5 in a recordable and/or reproducible high-density optical disk. FIG. 2B shows a case where data is continuously recorded at a plurality of physical clusters 15 in a recordable and/or reproducible high-density optical disk. Each of the physical clusters 5 and 15 includes 32 frames each having a capacity of 2 KB, a sync frame, data for controlling DC offsets, and an error correction code (ECC) for correcting errors. Here, the ECC may have a size of 64 KB.

Run-ins 3 and 13 are defined in front of the respective physical clusters 5 and 15, and run-outs 8 and 18 are defined behind the respective physical clusters 5 and 15. These run-ins 3 and 13 and the run-outs 8 and 18 are provided for accurately recording data in or reproducing data from the physical clusters 5 and 15.

Each of the run-ins 13 can include a guard1 13a having a predetermined pattern for overcoming overwriting due to a change in a data recording start point and a pre-amble 13b for signal processing such as locking or synchronizing. Each of the run-outs 18 can include a post-amble 18a for signal processing and a guard2 18b having a predetermined pattern for overcoming overwriting due to a change in a data recording start point. Consequently, the guard1 13a and the guard2 18b act as buffers for protecting user data.

Guards3 10 and 20 for, as an example, ensuring the buffer area of laser power instability when high power writing ends are provided at positions where recording ends. Data recording or reproducing with respect to a basic recording unit in which data of a predetermined capacity is recorded is completed with the guards3 10 and 20. In the above description, a physical cluster has been employed as a minimum recording unit in which user data is recorded, but additionally, a sector, an ECC block, or a frame can be employed in a minimum recording unit.

Figure 3A:
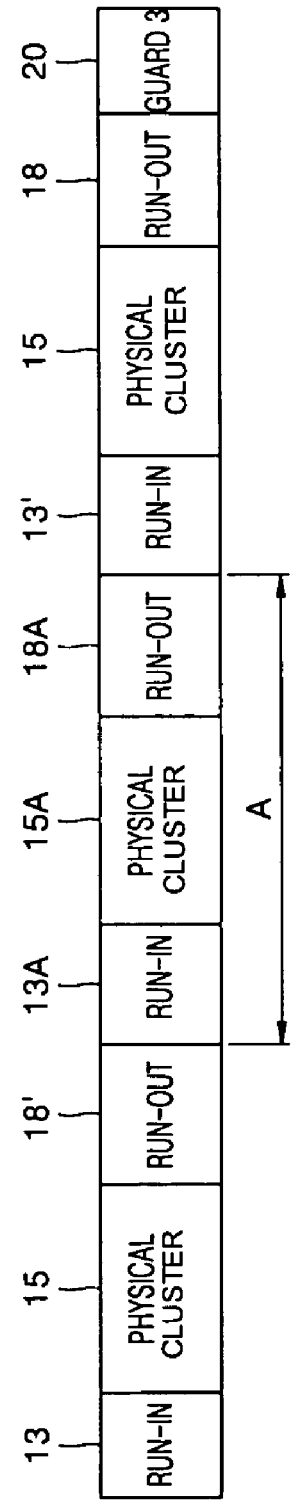
FIG. 3A is a diagram of a recording structure in which a portion where data is overwritten on an optical disk according to a first embodiment of the present invention is marked.
Figure 3B:
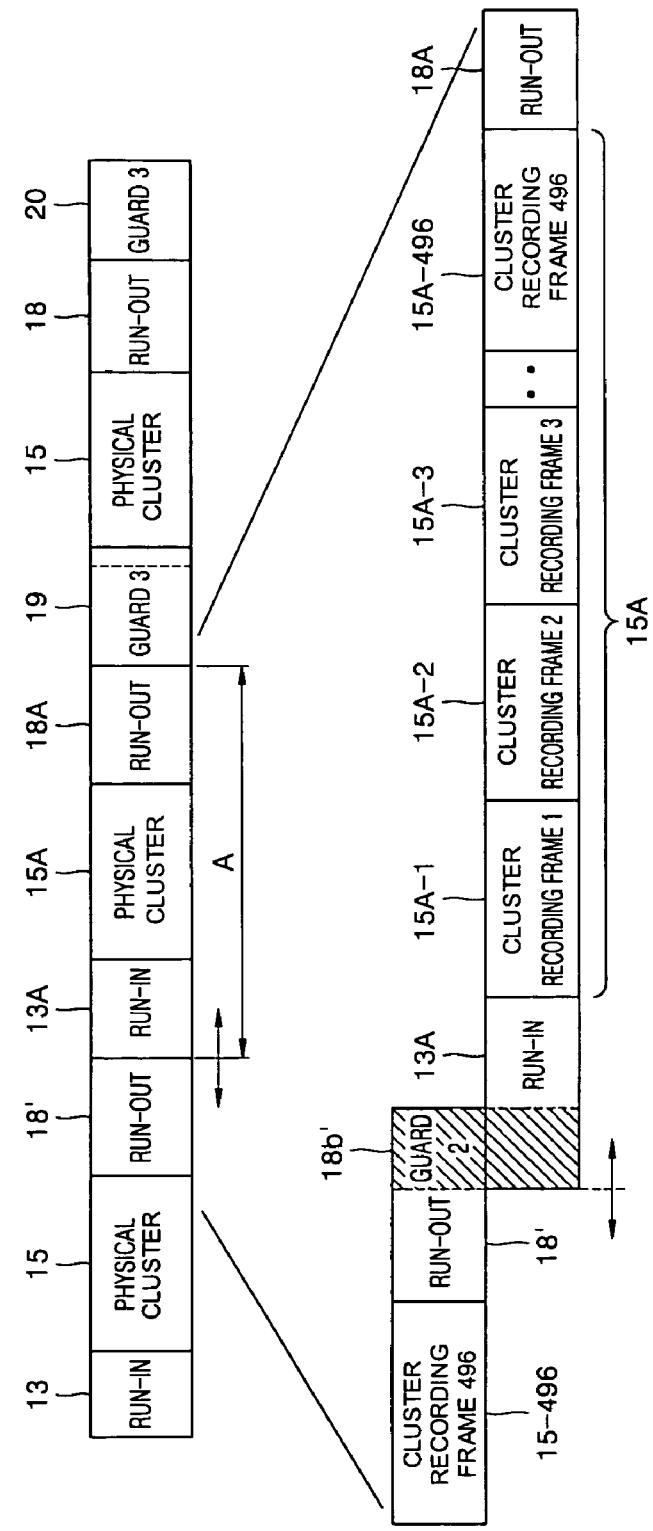
FIG. 3B is a diagram for explaining an optical disk and a method of recording data therein according to the first embodiment of the present invention.

FIG. 3A shows a case where overwriting is performed on a physical cluster 15A in which data has been continuously recorded. A run-in is provided in front of each of the physical clusters, and a run-out is provided behind each of the physical clusters. A guard3 20 is provided at a position where recording ends. For example, when overwriting is performed in an area A in FIG. 3A, a run-in, a physical cluster, and a run-out in the overwriting area are denoted by reference characters 13A, 15A, and 18A, respectively. Here, in a method of recording data in an optical disk according to a first embodiment of the present invention, as shown in FIG. 3B, linking occurs between a run-in 13A and a run-out 18' in front of an overwriting area A.

Linking allows recording to be performed smoothly when overwriting erroneously starts from a portion of the run-out 18' or a run-in 13A of FIG. 3A where overwriting should not be performed in the case where overwriting is performed on a part of a disk. In other words, linking is performed by performing error correction in front of the physical cluster 15A in which overwriting is performed in order to compensate for a case in which overwriting does not start at an exact recording start point. A bidirectional arrow between the run-in 13A and the run-out 18' in front of the overwriting area A in FIG. 3B indicates linking.

More specifically, linking can be performed by recording a guard2 18b' in the run-out 18'. It is preferable that the guard2 18b' in the run-out 18' and the guard3 20 have the same structure, that is, the same pattern and length. For example, if the guard3 20 has a length of at least 300 channelbits and a continuous pattern including 3T and 5T, it is preferable to configure the guard2 18b' to have a length of at least 300 channelbits and a continuous pattern including 3T and 5T. Here, 3T and 5T indicate length units of marks recorded in a disk. Configuring the guard2 18b' in the same structure as the guard3 20 is advantageous in that a linking scheme suggested for the guard3 20 can be applied to the guard2 18b' as it is.

Overwriting is smoothly performed by performing linking between the run-in 13A and the run-out 18' in front of the overwriting area A. Next, recoding or reproducing is performed on the physical cluster 15A following the run-in 13A, and a guard3 19 for terminating the recording is recorded in the run-in 13' following the run-out 18A where overwriting ends.

Here, the physical cluster 15A, for example, includes 496 recording frames 15A-1, 15A-2, . . . 15A-496 illustrated behind the run-in 13A in FIG. 3B. Reference numeral 15-496 denotes a 496-th recording frame of the physical cluster 15 in front of the run-out 18'.

In the first embodiment, a case where overwriting is performed on a single physical cluster has been described, but the same manner is applied to a case where overwriting is continuously performed on a plurality of physical clusters. In other words, when overwriting is performed on a plurality of physical clusters, linking is performed between a run-out and a run-in in front of an overwriting area, and a guard3 is recorded in a run-in behind an overwriting area.

Figure 4A:
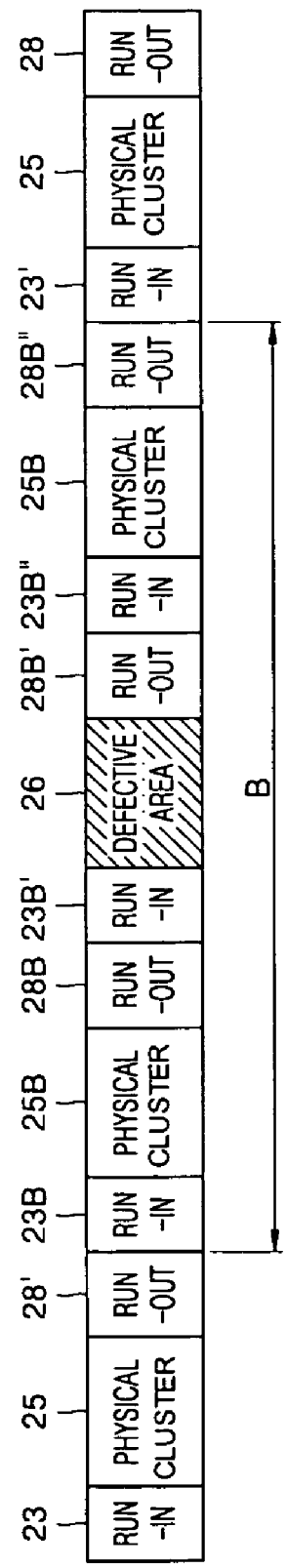
FIG. 4A is a diagram of a recording structure in which a portion where data is overwritten on an optical disk according to a second embodiment of the present invention is marked.

The following description concerns an optical disk and a recording method according to a second embodiment of the present invention. FIG. 4A shows a case where a defective area 26 on which recording and reproducing cannot be performed is detected while data is continuously recorded in or reproduced from a plurality of physical clusters 25B in a recordable and/or reproducible high-density optical disk. Here, the address of the defective area 26 is recorded in a defect list field. The defective area 26 can be detected during recording, reproducing, or disk verification. Run-ins 23 and 23B are provided in front of the physical clusters 25 and 25B, respectively, and run-outs 28' and 28B are provided behind the physical clusters 25 and 25B.

A recording method according to the second embodiment of the present invention is applied when data is overwritten in a recording area in which data has been recorded in an optical disk including the defective area 26. In FIG. 4A, an overwriting area is denoted by a reference character B. Run-ins, physical clusters, and run-outs within the overwriting area B are denoted by reference characters including B.

Figure 4B:
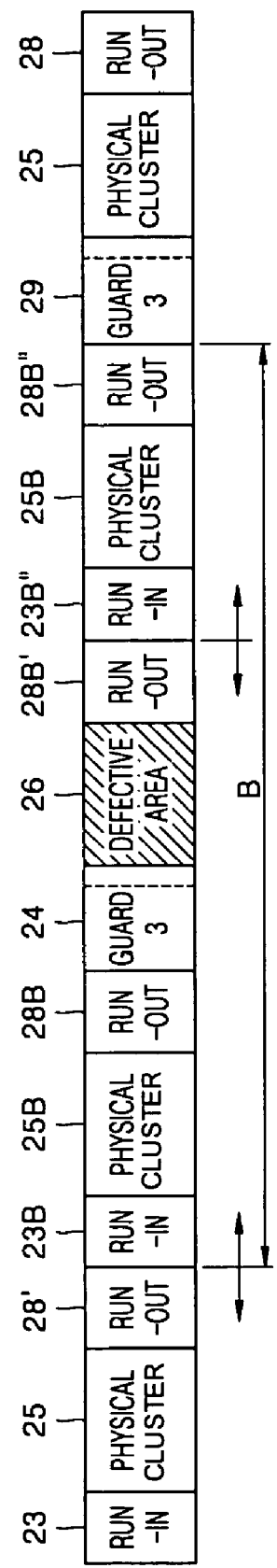
FIG. 4B is a diagram for explaining an optical disk and a method of recording data therein according to the second embodiment of the present invention.

Linking is performed between a run-in 23B and a run-out 28' in front of the overwriting area B in FIG. 4B. Linking is indicated by bidirectional arrows in FIG. 4B. Linking has been described above with reference to FIG. 3B, and thus a detailed description thereof will be omitted.

Next, since recording cannot be performed on the defective area 26, recording end data for terminating the recording is recorded in a run-in 23B' right in front of the defective area 26. A guard3 24, i.e., recording end data, may be configured in the same manner as the guard3 20 shown in FIG. 2B. For example, the guard3 20 can be configured to have a length of at least 300 channelbits and a continuous pattern including 3T and 5T, and it is preferable to configure the recording end data to have the same length and pattern as the guard3 20.

Next, when overwriting is started again behind the defective area 26, linking is performed between a run-out 28B' and a run-in 23B" following the defective area 26, as indicated by a bidirectional arrow therebetween. Linking is performed in the same manner as described above. A guard3 29, as an example, ensuring the buffer area of laser power instability when high power writing ends is recorded in a run-in 23' following a last run-out 28B" of the overwriting area B.

Referring to FIGS. 3B and 4B, an optical disk according to the present invention is designed to allow linking to occur between the run-outs 18' and 28' and the run-ins 13A and 23B in front of the overwriting areas A and B when overwriting is performed. In the optical disk, recording end data, for example, a guard3 24, for terminating the recording is recorded in front of the defective area 26.

In addition, the optical disk of the present invention is designed to allow linking to occur between the run-out 28B' and the run-in 23B" following the defective area 26. In the optical disk, guards3 19 and 29 are recorded behind the last run-outs 18A and 28B", respectively, of the overwriting areas A and B.

When data is recorded in or reproduced from an optical disk according to the present invention, a light source having a celadon green wavelength and an objective lens having a numerical aperture (NA) of at least 0.7 are used. In addition, an optical disk according to the present invention is characterized by having a track pitch of no greater than 0.35 μm, a minimum recording mark having a length of no greater than 0.2 μm, an ECC recording unit of at least 32 KB, and a recording capacity of at least 20 GB.

As described above, the present invention can realize stable and reliable data recording and reproducing by performing linking when overwriting is performed after data has been continuously recorded in a high-density optical disk or when overwriting is performed on a high-density optical disk including a defective area, and recording a guard3, i.e., recording end data, at an appropriate position.

In an optical disk and a method of recording data in the optical disk according to the present invention, when overwriting is performed on a portion of the optical disk in which data has been recorded, or when overwriting is performed on a portion including a defective area, linking is performed in front of the portion on which the overwriting is performed or behind the defective area, thereby realizing reliable data recording and reproducing. In addition, a guard3 is recorded in a portion in front of the defective area and in a portion behind an overwriting area to stop the recording. The present invention proposes standards for overwriting and processing defective areas with respect to high-density optical disks in which data is continuously recorded or reproduced, thereby securing compatibility between disks and disk drives and improving recording and reproducing performance on high-density optical disks.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for recording and/or reproducing data with respect to a recordable and/or reproducible optical disk, the apparatus comprising:
    an optical pickup which emits a light beam used to record and/or reproduce the data with respect to the optical disk; and
    a processor which records and/or reproduces the data with respect to the optical disk using the optical pickup, and, when the data is overwritten during recording, performs linking in front of a physical cluster from which overwriting starts, wherein the processor further records a guard3 in a portion following a physical cluster in which overwriting ends, and wherein the processor uses the guard3 in terminating the recording.

2. The apparatus of claim 1, wherein the linking is performed between adjacent run-out and run-in in front of the physical cluster from which overwriting starts, and a run-in and a run-out are formed respectively in front of and behind every physical cluster to allow the processor to accurately record the data.

3. An apparatus for recording and/or reproducing data with respect to a recordable and/or reproducible optical disk, the apparatus comprising:

an optical pickup which emits a light beam used to record and/or reproduce the data with respect to the optical disk; and a processor which records and/or reproduces the data with respect to the optical disk using the optical pickup, and, when the data is overwritten during recording, performs linking in front of a physical cluster from which overwriting starts, wherein the linking is performed between adjacent run-out and run-in in front of the physical cluster from which overwriting starts, and a run-in and a run-out are formed respectively in front of and behind every physical cluster to allow the processor to accurately record the data, and wherein the run-in and the run-out comprise a guard1 and a guard2, respectively, and the processor uses the guard1 and guard2 to protect user data.

4. The apparatus of claim 1, wherein the guard3 for terminating the recording is recorded by the processor in a run-in next to a run-out following the physical cluster in which overwriting ends, and the processor forms a run-in and a run-out respectively in front of and behind every physical cluster to allow the processor to accurately record the data.

5. An apparatus for recording and/or reproducing data with respect to a recordable and/or reproducible optical disk, the apparatus comprising:

an optical pickup which emits a light beam used to record and/or reproduce the data with respect to the optical disk; and a processor which records and/or reproduces the data with respect to the optical disk using the optical pickup, and, when the data is overwritten during recording, performs linking in front of a physical cluster from which overwriting starts, wherein the guard3 for terminating the recording is recorded by the processor in a run-in next to a run-out following the physical cluster in which overwriting ends, and the processor forms a run-in and a run-out respectively in front of and behind every physical cluster to allow the processor to accurately record the data, and wherein the guard2 and the guard3 have the same length and pattern.

6. The apparatus of claim 5, wherein the guard3 has a length of at least 300 channelbits and a continuous pattern including at least 3T and 5T.

7. The apparatus of claim 1, wherein the optical pickup includes a light source emitting the light beam of a celadon green wavelength for use with recording and/or reproducing the data with respect to the optical disk.

8. The apparatus of claim 1, wherein the optical pickup includes an objective lens having a numerical aperture of at least 0.7 for use in focusing the light beam on the optical disk when the data is recorded in or reproduced from the optical disk.

9. The apparatus of claim 1, wherein the optical disk has a track pitch of no greater than 0.35 μm, a minimum recording mark having a length of no greater than 0.2 μm, and an error correction code (ECC) recording unit of at least 32 KB.

10. The apparatus of claim 4, wherein the optical disk has a track pitch of no greater than 0.35 μm, a minimum recording mark having a length of no greater than 0.2 μm, and an error correction code (ECC) recording unit of at least 32 KB.

11. An apparatus for recording and/or reproducing data with respect to a recordable and/or reproducible optical disk comprising a plurality of physical clusters in which data is recorded, and a plurality of run-ins and run-outs provided in front of and behind the physical clusters to allow data to be accurately recorded, the apparatus comprising:

an optical pickup which emits a light beam used to record and/or reproduce the data with respect to the optical disk; and a processor which records and/or reproduces the data with respect to the optical disk using the optical pickup, and, when overwriting is performed in units of physical clusters, performs linking between a run-in and an adjacent run-out in front of a physical cluster from which the overwriting starts, wherein the processor records a guard3 in a run-in following a physical cluster in which the overwriting ends when the overwriting is performed in units of physical clusters, and the processor uses the guard3 in terminating the recording.

12. An apparatus for recording and/or reproducing data with respect to a recordable and/or reproducible optical disk comprising a plurality of physical clusters in which data is recorded, and a plurality of run-ins and run-outs provided in front of and behind the physical clusters to allow data to be accurately recorded, the apparatus comprising:

an optical pickup which emits a light beam used to record and/or reproduce the data with respect to the optical disk; and a processor which records and/or reproduces the data with respect to the optical disk using the optical pickup, and, when overwriting is performed in units of physical clusters, performs linking between a run-in and an adjacent run-out in front of a physical cluster from which the overwriting starts, wherein each of the run-ins comprises a guard1, and each of the run-outs comprises a guard2, which the processor uses to protect user data.

13. The apparatus of claim 11, wherein the guard2 and the guard3 have the same length and pattern.

14. The apparatus of claim 13, wherein the guard3 has a length of at least 300 channelbits and a continuous pattern including at least 3T and 5T.

15. The apparatus of claim 11, wherein the optical pickup includes a light source emitting the light beam having a celadon green wavelength for use when the data is recorded in or reproduced from the optical disk.

16. The apparatus of claim 11, wherein the optical pickup includes an objective lens having a numerical aperture of at least 0.7 for use in focusing the light beam on the optical disk when the data is recorded in or reproduced from the optical disk.

17. The apparatus of claim 11, wherein the optical disk has a track pitch of no greater than 0.35 μm, a minimum recording mark having a length of no greater than 0.2 μm, and an error correction code (ECC) recording unit of at least 32 KB.

18. The apparatus of claim 1, wherein the processor performs linking between adjacent run-out and run-in in front of the physical cluster from which overwriting starts, and a run-in and a run-out are formed respectively in front of and behind every physical cluster to allow the data to be accurately recorded.

19. The apparatus of claim 3, wherein the processor records the guard3 for terminating the recording in a run-in next to a run-out following the physical cluster in which overwriting ends, and forms a run-in and a run-out respectively in front of and behind every physical cluster to allow the processor to accurately record the data.

20. The apparatus of claim 1, wherein the optical pickup includes a light source emitting the light beam having a celadon green wavelength for use when the data is recorded in or reproduced from the optical disk.

21. The apparatus of claim 1, wherein the optical pickup includes an objective lens having a numerical aperture of at least 0.7 for use in focusing the light beam on the optical disk when the data is recorded in or reproduced from the optical disk.

22. The apparatus of claim 1, wherein the optical disk has a track pitch of no greater than 0.35 μm, a minimum recording mark having a length of no greater than 0.2 μm, and an error correction code (ECC) recording unit of at least 32 KB.

23. The apparatus of claim 11, wherein each of the run-ins comprises a guard1, and each of the run-outs comprises guard2, which the processor uses to protect user data.

24. The apparatus of claim 11, wherein the optical pickup includes a light source emitting the light beam having a celadon green wavelength for use when the data is recorded in or reproduced from the optical disk.

25. The apparatus of claim 11, wherein the optical pickup includes an objective lens having a numerical aperture of at least 0.7 for use in focusing the light beam on the optical disk when the data is recorded in or reproduced from the optical disk.

26. The apparatus of claim 11, wherein the optical disk has a track pitch of no greater than 0.35 μm, a minimum recording mark having a length of no greater than 0.2 μm, and an error correction code (ECC) recording unit of at least 32 KB.

* * * * *

UNITED STATES PATENT AND TRADEMARK OFFICE
CERTIFICATE OF CORRECTION

| | |
|---|---|
| PATENT NO. | : 7,145,861 B2 |
| APPLICATION NO. | : 10/886554 |
| DATED | : December 5, 2006 |
| INVENTOR(S) | : Kyung-geun Lee et al. |

It is certified that error appears in the above-identified patent and that said Letters Patent is hereby corrected as shown below:

Title Page, (73) Assignees, insert --; Matsushita Electric Industrial Co., Ltd., Osaka (JP)-- after "Samsung Electronics Co., Ltd., Suwon-si, Republic of Korea (KR)"

Signed and Sealed this

First Day of January, 2008

JON W. DUDAS
*Director of the United States Patent and Trademark Office*